US011388634B2

(12) United States Patent
Rom et al.

(10) Patent No.: US 11,388,634 B2
(45) Date of Patent: Jul. 12, 2022

(54) SELECTION OF A TARGET CELL FOR HANDOVER BASED ON CHANNEL IMPULSE RESPONSE METRIC

(71) Applicant: NOKIA TECHNOLOGIES OY, Espoo (FI)

(72) Inventors: Christian Rom, Aalborg (DK); Samantha Caporal Barrio, Aalborg (DK); Ahmad Awada, Munich (DE); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 15 days.

(21) Appl. No.: 16/879,417

(22) Filed: May 20, 2020

(65) Prior Publication Data

US 2020/0396653 A1 Dec. 17, 2020

Related U.S. Application Data

(60) Provisional application No. 62/861,248, filed on Jun. 13, 2019.

(51) Int. Cl.
H04W 36/00 (2009.01)
H04W 76/27 (2018.01)
H04L 25/02 (2006.01)
(Continued)

(52) U.S. Cl.
CPC ..... *H04W 36/0058* (2018.08); *H04L 25/0212* (2013.01); *H04W 36/00835* (2018.08);
(Continued)

(58) Field of Classification Search
CPC ............. H04W 24/10; H04W 36/0058; H04W 36/0085; H04W 36/00835; H04W 36/08;
(Continued)

(56) References Cited

U.S. PATENT DOCUMENTS

2013/0121187 A1* 5/2013 Das .................. H04B 17/309
370/252
2018/0309599 A1* 10/2018 Lee .................. H04B 7/0617
(Continued)

FOREIGN PATENT DOCUMENTS

EP          2874437 A1    5/2015
WO     2013/070847 A1    5/2013

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.4.0, Dec. 2018, pp. 1-97.

(Continued)

*Primary Examiner* — Quoc Thai N Vu
(74) *Attorney, Agent, or Firm* — Nokia Technologies Oy

(57) ABSTRACT

A method, apparatus, and computer-readable storage medium are provided for selecting a target cell based on channel impulse response (CIR) measurements, which may include receiving measurement configuration information including a CIR parameter from a first network node and may further include generating one or more measurement reports based on the CIR parameter, the one or more measurement reports including CIR measurements of one or more beams of one or more neighbor cells associated with the first network node and/or second network nodes and transmitting the one or more measurement reports to the first network node.
The selecting a target cell based on CIR measurements may include transmitting measurement configuration information including a CIR parameter and receiving one or more measurement reports, including CIR measurements of one or more beams of one or more network nodes and selecting a target cell for handover using the measurements.

17 Claims, 10 Drawing Sheets

(51) Int. Cl.
    H04W 36/08    (2009.01)
    H04W 72/04    (2009.01)
(52) U.S. Cl.
    CPC ......... *H04W 36/08* (2013.01); *H04W 72/046* (2013.01); *H04W 76/27* (2018.02)
(58) Field of Classification Search
    CPC ......... H04W 36/0088; H04W 36/0094; H04W 37/046; H04W 76/27; H04W 72/046; H04B 17/318; H04B 17/309; H04L 25/0212
    See application file for complete search history.

(56) References Cited

U.S. PATENT DOCUMENTS

2018/0338271 A1    11/2018  Park et al.
2020/0244331 A1*   7/2020   Karri .................. H04B 7/0417

OTHER PUBLICATIONS

"Triggers for Conditional Handover in NR", 3GPP TSG-RAN WG2 Meeting #105, R2-1901585, Agenda: 11.9.3, InterDigital Inc, Feb. 25-Mar. 1, 2019, pp. 1-3.
"Conditional Handover in NR", 3GPP TSG RAN WG2 #105, R2-1900404, Agenda: 11.9.3, Ericsson, Feb. 25-Mar. 1, 2019, pp. 1-6.
"Mobility Failure Recovery in NR", 3GPP TSG-RAN WG2 Meeting #105, R2-1900162, Agenda: 11.9.3, MediaTek Inc, Feb. 25-Mar. 1, 2019, pp. 1-6.
"Conditional Handover in NR", 3GPP TSG-RAN WG2 Meeting #105, R2-1900282, Agenda: 11.9.3, CATT, Feb. 25-Mar. 1, 2019, pp. 1-4.
"Conditional HO Design Considerations", 3GPP TSG-RAN WG2 Meeting #105, R2-1900365, Agenda: 11.9.3, Qualcomm Incorporated, Feb. 25-Mar. 1, 2019, 4 pages.
"Discussion on CHO Solution in NR", 3GPP TSG-RAN WG2 #105, R2-1900709, Agenda: 11.9.3, Huawei, Feb. 25-Mar. 1, 2019, 3 pages.
"Discussion of Conditional Handover", 3GPP TSG RAN WG2 Meeting #105, R2-1901365, Agenda: 11.9.3, Intel Corporation, Feb. 25-Mar. 1, 2019, pp. 1-5.
"Details of Conditional Handover Procedure for NR", 3GPP TSG-RAN WG2 Meeting #105, R2-1901584, Agenda 11.9.3, InterDigital Inc, Feb. 25-Mar. 1, 2019, pp. 1-4.
"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.4.0, Dec. 2018, pp. 1-923.
Zhang et al., "Coverage and Channel Characteristics of Millimeter Wave Band Using Ray Tracing", IEEE International Conference on Communications (ICC), Jun. 8-12, 2015, pp. 1380-1385.
Zhang et al., "Experimental Characterization of Millimeter-Wave Indoor Propagation channels at 28 GHz", IEEE Access, vol. 6, Nov. 21, 2018, pp. 76516-76526.
MacCartney et al., "Exploiting Directionality for Millimeter-Wave Wireless System Improvement", IEEE International Conference on Communications (ICC), 2015, pp. 2416-2422.
Athaudage et al., "Delay-Spread Estimation using Cyclic-Prefix in Wireless OFDM Systems", IEE Proceedings—Communications, vol. 151, No. 6, Dec. 24, 2004, pp. 559-566.
Martikainen et al., "On the Basics of Conditional Handover for 5G Mobility", IEEE 29th Annual International Symposium on Personal, Indoor and Mobile Radio Communications (PIMRC), Sep. 9-12, 2018, 7 pages.
Simonsson et al., "Beamforming Impact on Time Dispersion Assessed on Measured Channels", IEEE 87th Vehicular Technology Conference (VTC Spring), Jun. 3-6, 2018, 6 pages.
Bryan et al., "JavaScript Object Notation (JSON) Patch", RFC 6902, Internet Engineering Task Force (IETF), Apr. 2013, pp. 1-18.
"MulteFire Alliance Technical Specification Group Radio Access Network; Evolved Universal Terrestrial Radio Access Network (E-UTRAN); X2 application protocol (X2AP) (Release 1.1)", MFA TS 36.423, V1.1.1, Feb. 2018, pp. 1-250.
"MulteFire Alliance Technical Specification Group Radio Access Network; Evolved Universal Terrestrial Radio Access (E-UTRA); Radio Resource Control (RRC); Protocol specification (Release 1.1)", MFA TS 36.331, V1.1.1, Feb. 2018, pp. 1-786.
"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.
Extended European Search Report received for corresponding European Patent Application No. 20177766.1, dated Nov. 18, 2020, 10 pages.

* cited by examiner

SELECTION OF A TARGET CELL FOR HANDOVER BASED ON CHANNEL IMPULSE RESPONSE METRIC

CROSS REFERENCE TO RELATED APPLICATION

This application claims the benefit of U.S. provisional application No. 62/861,248 entitled "SELECTION OF A TARGET CELL FOR HANDOVER BASED ON CHANNEL IMPULSE RESPONSE METRIC" filed on 13 Jun. 2019, which is incorporated herein by reference in its entirety.

TECHNICAL FIELD

This description relates to wireless communications, and in particular, to selection of a target cell for handover.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and computer-readable storage medium are provided for selecting a target cell based on channel impulse response (CIR) measurements. In an example implementation, the method may include receiving measurement configuration information from a first network node, the first network node including a serving cell of the user equipment (UE) and the measurement configuration information including a channel impulse response (CIR) parameter. The example method may further include generating one or more measurement reports based on the channel impulse response (CIR) parameter, the one or more measurement reports including channel impulse response (CIR) measurements of one or more beams of one or more neighbor cells associated with the first network node and/or second network nodes and transmitting the one or more measurement reports to the first network node. In an another example implementation, the method may include transmitting measurement configuration information from a first network node to a user equipment (UE), the first network node including a serving cell of the user equipment (UE) and the measurement configuration information including a channel impulse response (CIR) parameter. The example method may further include receiving one or more measurement reports from the user equipment (UE), the one or more measurement reports including channel impulse response (CIR) measurements of one or more beams of one or more neighbor cells associated with the first network node and/or one or more second network nodes and selecting a second network node as a target cell for handover of the user equipment (UE).

DETAILED DESCRIPTION

Figure 1:
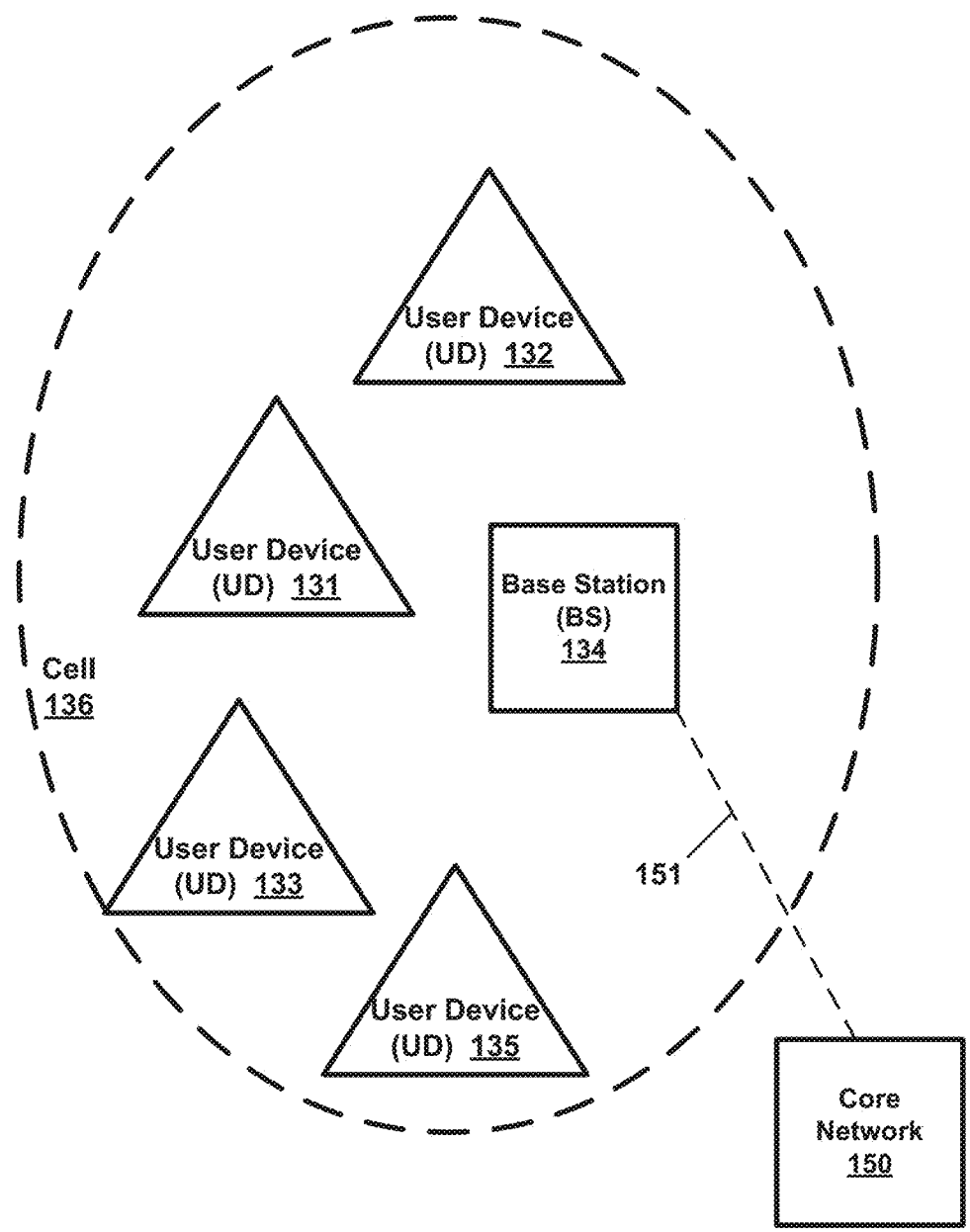
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

Several procedures exist for identifying and/or selecting a target cell for performing a handover of user equipment (UE) from a source cell to the target cell. The identifying and/or selecting of the target cell are typically based on received power measurements of beams received from cells/network nodes. For instance, the cell received power measurements may be an average of N strongest beams above a threshold T, where N and T are configured by the network. However, in wireless communications using higher radio frequencies (e.g., mmWave spectrum), a radio link of a UE (or a UE connection) can be sensitive to physical blockers (e.g., physical obstacles such a moving truck) that can obstruct signals being transmitted to the UE. Moreover, such sensitivity to physical blockers worsens because of physical properties of the higher radio frequencies, makes UE's radio link more sensitive to sudden blockers, and leads to radio link failures (RLFs).

Therefore, there is desire and/or need to prioritize handovers to target cells that are more robust and/or offer improved/increased mobility robustness to sudden blockers. The improved robustness may be achieved based on reduced RLFs due to a richer (e.g., wider) scatter environment (e.g., area) where a UE may exploit multiple beams as a result of multiple signal reflections from surrounding buildings, objects and/or other physical elements. In other words, the improved/increased mobility robustness to sudden blockers may be due to multiple uncorrelated strong beams at the UE when, for example, a physical blocker (e.g., a vehicle) may absorb the signal from some of the serving beams from/to the serving cell. For example, in some implementations, in a cell with well scattered beams, the UE may be able to perform beam switching to maintain the radio link to the serving cell instead of being forced to perform a handover/conditional handover to a target cell with a higher risk of RLF.

Figure 2:
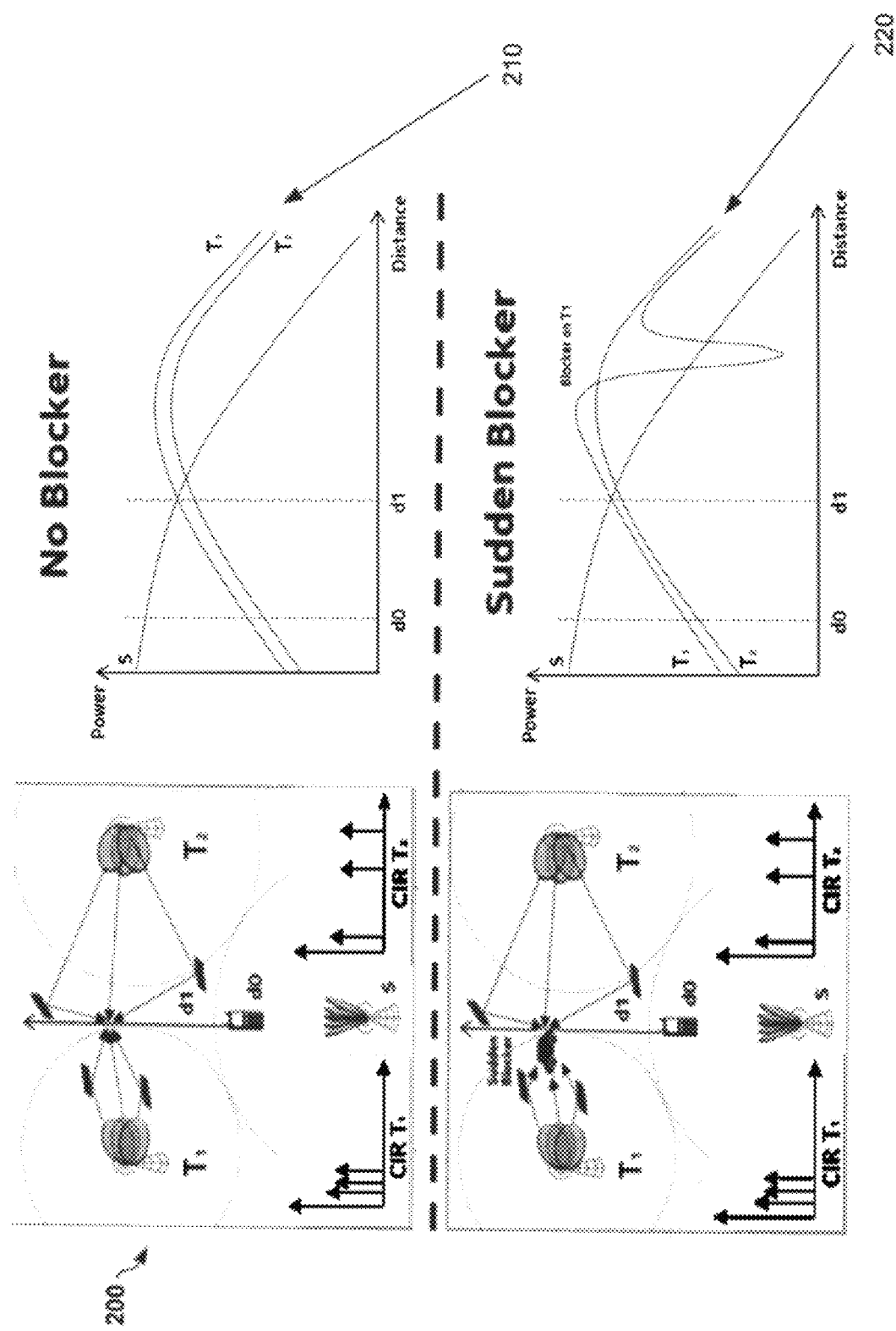
FIG. 2 illustrates correlations between beams received from target cells and the effect of blockers, according to at least an example implementation.

FIG. 2 illustrates correlations 200 between beams received from target cells and the effect of blockers, according to at least an example implementation.

Figure 3:
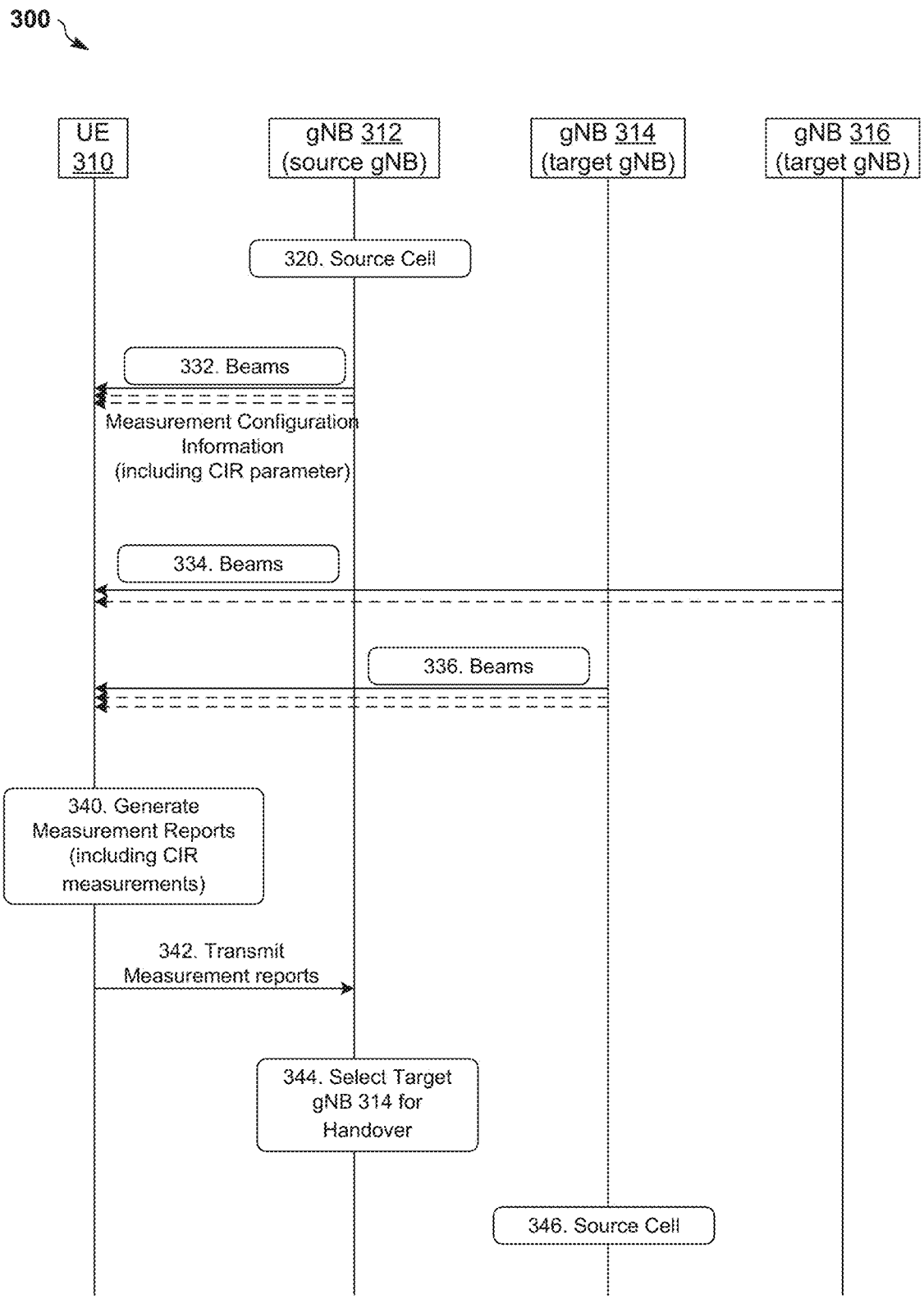
FIG. 3 is a message flow diagram illustrating a proposed mechanism for identifying and/or selecting a target cell based on a radio channel metric, according to an example implementation.
Figure 4:
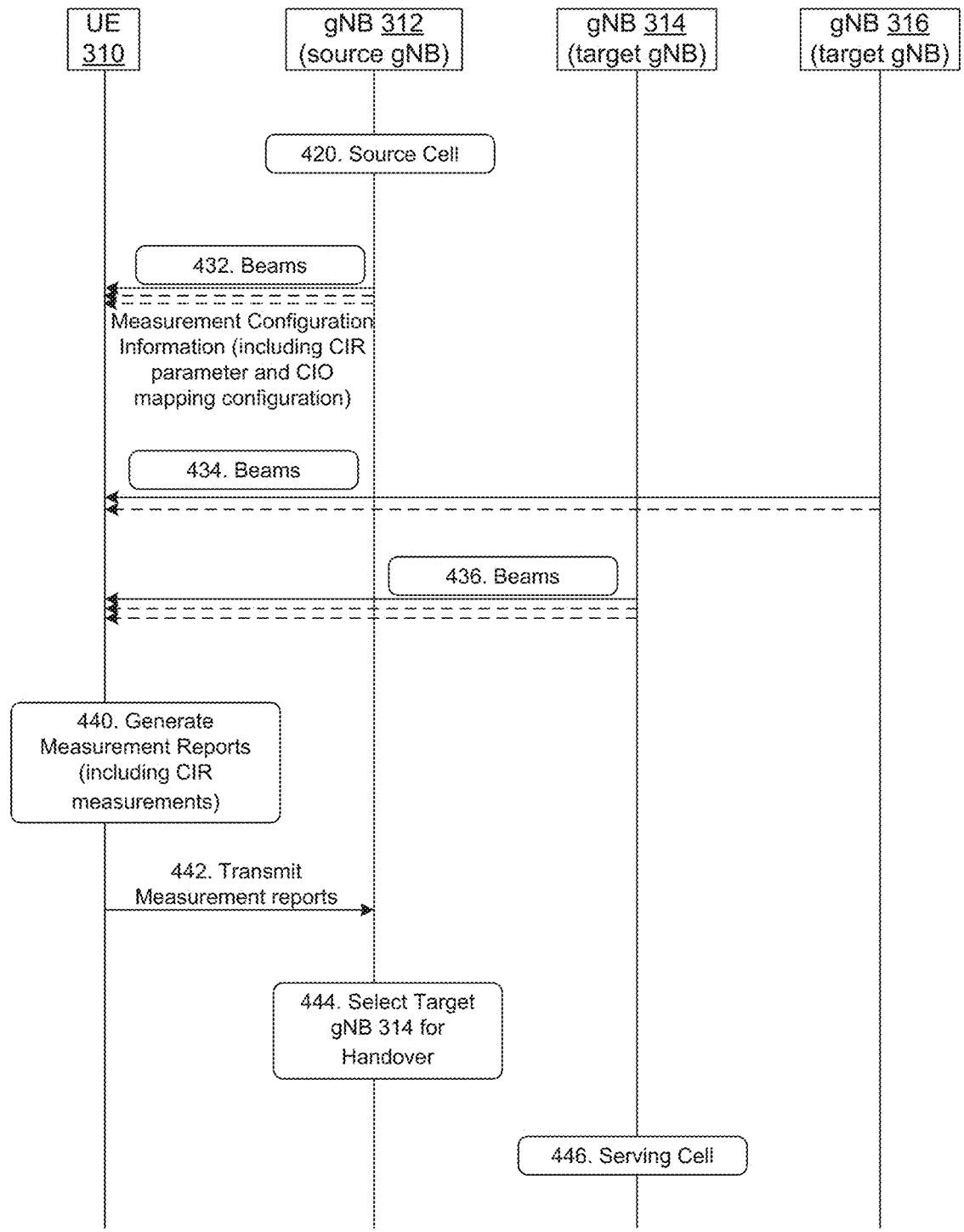
FIG. 4 is a message flow diagram illustrating another proposed mechanism for identifying and/or selecting a target cell by scaling cell individual offsets (CIOs) based on channel impulse response (CIR) measurements, according to an example implementation.

In FIG. 2, two target cells (e.g., T1 and T2) with similar received power at a UE are illustrated. The target cells may be similar to (or same as) target gNBs 316 and 314, respectively, and the UE may be similar to (or same as) UE 310, as shown in FIGS. 3 and 4.

In some implementations, the first target cell T1 may have slightly better cell received power when compared to target cell T2, as shown at 210. But, target cell T1 may be much more sensitive to a blocker such as a passing car or truck which may significantly reduce the cell received power at the UE, as shown at 220. However, the second target cell T2 may be rich in reflections and the UE may detect multiple diverse beams with different angles of arrival. In some implementations, for example, such reductions in the cell received power, for example, due to a blocker, may be reflected in channel impulse response (CIR) measurements of beams which may show that the beams arriving at the UE may have very similar propagation delay and in turn may have some correlation.

The proposed disclosure, therefore, provides an example method, apparatus, and computer-readable storage medium for identifying and/or selecting a target cell based on a radio channel condition metric. In some implementations, for example, the radio channel condition metric may be channel impulse response (CIR) measurements.

In an example implementation, the method may include receiving measurement configuration information from a first network node, the first network node including a serving cell of the user equipment (UE) and the measurement configuration information including a channel impulse response (CIR) parameter. The example method may further include generating one or more measurement reports based on the channel impulse response (CIR) parameter, the one or more measurement reports including channel impulse response (CIR) measurements of one or more beams of one or more neighbor cells associated with the first network node and/or second network nodes and transmitting the one or more measurement reports to the first network node.

In an another example implementation, the method may include transmitting measurement configuration information from a first network node to a user equipment (UE), the first network node including a serving cell of the user equipment (UE) and the measurement configuration information including a channel impulse response (CIR) parameter. The example method may further include receiving one or more measurement reports from the user equipment (UE), the one or more measurement reports including channel impulse response (CIR) measurements of one or more beams of one or more neighbor cells associated with the first network node and/or one or more second network nodes and selecting a second network node as a target cell for handover of the user equipment (UE).

FIG. 3 is a message flow diagram 300 illustrating a proposed mechanism for identifying and/or selecting a target cell based on a radio channel metric, according to an example implementation.

In some implementations, for example, the proposed mechanism may be based on channel impulse response (CIR) measurements as the channel condition metric. The CIR measurements, for example, may be used by itself and/or in combination with other measurements.

FIG. 3 illustrates a UE 310, a source gNB (e.g., gNB 312), and/or one or more target gNBs (e.g., gNBs 314 and gNB 316). In the present disclosure, source gNB 312 may be referred to a source cell and/or gNBs 314 and 316 may be referred to as target cells. In some implementations, gNB 312, for example, may include one or more cells (including a source cell) and each of gNBs 314 and/or 316, for example, may include one or more cells as well. In addition, in some implementations, each of the one or more cells of gNBs 312, 314, and/or 316 may transmit one or more beams and the one or more beams may be associated with corresponding transmission reception points (TRPs) of the corresponding cells.

The beams illustrated in FIG. 3 (e.g., beams 332, 334, and/or 336) as being transmitted by gNBs 312, 314, and/or 316 are for illustration purposes only and not as limitations. In some implementations, for example, network operators may configure each of the gNBs (e.g., source and/or target gNBs) with a plurality of cells and each of the plurality of cells may be configured with one or more TRPs to transmit one or more beams.

At 320, UE 310 may be camped on a source cell or source gNB, e.g., gNB 312. In some implementations, as described above, gNB 312 may be configured with one or more cells, including the source cell and non-source cells. The non-source cells (e.g., cells other than the source cell) may be considered as neighbor cells which may be considered as target cells for performing a handover.

At 332, UE 310 may receive one or more beams from the source cell, e.g., gNB 312. In some implementations, a beam received from the source cell may include measurement configuration information. At 334, UE 310 may receive one or more beams from a target cell, e.g., gNB 314. As described above, gNB 314 may be configured with one or more cells and the one or more cells of gNB 314 may be considered as neighbor cells. At 336, UE 310 may receive one or more beams from another target cell, e.g., gNB 316. As described above, gNB 316 may be configured with one or more cells and the one or more cells of gNB 316 may also be considered as neighbor cells. Although FIG. 3 illustrates beams 332, 334, and/or 336 being transmitted (e.g., by gNBs 312, 314, and/or 316) and/or received one after the other by the UE, they are shown as such for illustration purposes only and beams 332, 334, and/or 336 may be transmitted by the gNBs and/or received by the UE at around the same time so that UE 310 may evaluate the received beams for identifying and/or selecting the target cell (e.g., best target cell) for performing handover of the UE 310.

At 332, as described above, UE 310 may receive one or more beams from one or more cells, including source cell gNB 312. In some implementations, for example, UE 310 may receive measurement configuration information via a beam received from the source cell. The measurement configuration information may indicate to UE 310 the measurements to be performed by UE 310, as described in 3GPP Specifications (e.g., 3GPP TS38.331 V15.4.0 NR; Radio Resource Control (RRC) protocol specification (release 15); MulteFire Alliance Technical Specification Group Radio Access Network; Evolved Universal Terrestrial Radio Access (E-UTRA); Radio Resource Control (RRC); Protocol specification (Release 1.1); MFA TS36.331 v1.1.1 (2018 February)).

In an example implementation as described in the present disclosure, the measurement configuration information may further include a channel impulse response (CIR) parameter to be measured by the UE (in addition to the measurements described in 3GPP Specifications). In other words, in addition to the measurements to be performed by the UE as described in 3GPP Specifications, the proposed mechanism may indicate to UE 310 to perform CIR measurements based on, for example, the CIR parameter indicated by measurement configuration information transmitted from the source cell for determining the best (optimal) target cell for performing a handover of the UE. In some implementations, for example, the CIR measurements (of beams), as illustrated at 220 of FIG. 2, may assist in determining the best target cell by taking into consideration the CIR measurements. In some implementations, for example, gNB 314 may be similar to target cell T2 and/or gNB 316 may be similar to target cell T1 which may have a sudden blocker and thus affecting its CIR measurements.

At 340, UE 310 may generate measurement reports. In some implementations, the measurement reports may be generated based on the measurement configuration information received from the source cell. For example, the measurement reports generated by UE 310 may include CIR measurements of the beams received by UE 310 (for example, from cells 312, 314, and/or 316) in addition to other measurements as defined in the 3GPP Specifications. In other words, in some implementations, UE 310 may generate measurement reports which may include CIR measurements (for example, based on the CIR parameter indicated in the measurement configuration information transmitted from the source cell) of one or more beams received from gNBs 312, 314, and/or 316. For example, UE 310 may generate a measurement report that includes CIR measurements for beams 332, 334, and/or 336 received from gNBs 312, 314, and/or 316. In some implementations, for example, UE 310 may be in a radio resource control (RRC) CONNECTED mode or an equivalent RRC mode when performing the CIR measurements.

In some implementations, the measurement reports generated by UE 310 may include CIR measurements. In one example implementation, the CIR measurements may be included in a measurement report on a per-beam basis. In another example implementation, the CIR measurements may be included in the measurement report as an average CIR of all beams received from a transmission reception point (TRP) or an average CIR of all beams received from a cell (e.g., as a cell can serve multiple TRPs). In some implementations, for example, the measurement report may include CIR measurements based on a root mean square (RMS) delay spread of the CIR per beam (e.g., on a per-beam basis). In another example implementation, the measurement report may include CIR measurements which may be based on a root mean square (RMS) delay spread of the average CIR over all beams from a TRP or over all beams from a cell. In some implementations, for example, the measurement reports may include CIR measurements based on a maximum excess delay of the CIR per beam or of the average CIR over all beams in a TRP or over all beams in a cell.

In some implementations, for example, the CIR measurements per beam may be reported using a fixed container of M CIR paths with N bits allocated for amplitude per CIR path and N bits for delay per CIR path. In an example implementation, M may have a value of 3 to 8 and N may have a value of 4 or 5. The amplitude for each path may be the strongest path relative to the received power and for the other paths relative to the strongest path. The delay for each path may be expressed as a proportion of the cyclic prefix for given numerology with 4 bits each step resulting in a $16^{th}$ of the CP duration. In addition, in some implementations, for example, a beam indicator may be needed for each CIR. In some implementations, for example, when the CIR measurement is an average CIR over all beams from a TRP or cell, the container described above may be used, but without the need for a beam indicator. In some implementations, for example, when RMS delay spread or maximum excess delay is used for CIR measurements, it may be just a delay value. So, the RMS delay spread may be a proportion of the CP, for example, N bits for the delay (N may be 4 or 5).

At 342, the UE (e.g., UE 310) may transmit the measurement reports generated at 340 to the source cell (e.g., gNB 312).

At 344, the source cell (e.g., gNB 312) may select the target cell for performing a handover of the UE from the source cell to a target cell. In some implementations, for example, gNB 312 may select gNB 314 as the target cell for performing a handover of the UE to gNB 314. In some implementations, for example, gNB 312 may select gNB 314 based on CIR measurements reported by UE 310 in the measurement report, as described above.

At 346, a UE may perform a handover to the selected target cell. In some implementations, for example, UE 310 performs handover to gNB 314. Upon successful completion of the handover to gNB 314, gNB 314 becomes the new source cell for UE 310.

Thus, the proposed disclosure, describes a mechanism for identifying and/or selecting a target cell on channel impulse response (CIR) measurements to improve, for example, mobility robustness.

FIG. 4 is a message flow diagram 400 illustrating another proposed mechanism for identifying and/or selecting a target cell by scaling cell individual offsets (CIOs) based on channel impulse response (CIR) measurements, according to an example implementation.

In some implementations, FIG. 4, similar to FIG. 3, illustrates a UE 310, a source gNB (e.g., gNB 312), and/or one or more target gNBs (e.g., gNBs 314 and 316). In some implementations, the beams illustrated in FIG. 4 (e.g., beams 432, 434, and/or 436) as being transmitted by gNBs 312, 314, and/or 316 are for illustration purposes only and not as limitations. The operations at 420 of FIG. 4, in some implementations, may be same or similar to operations at 320 of FIG. 3. In some implementations, at 420, UE 310 may be camped on a source cell or source gNB, e.g., gNB 312.

At 432, in some implementations, UE 310 may receive one or more beams from the source cell, e.g., gNB 312. For example, UE 310 may receive measurement configuration information via a beam received from the serving cell. The measurement configuration information may indicate to UE 310 the measurements to be performed by UE 310, as described in 3GPP Specifications. In an example implementation as described in the present disclosure, the measurement configuration information may include (in addition to the measurements described in 3GPP Specifications) a channel impulse response (CIR) parameter to be measured by the UE. In other words, in addition to the measurements to be performed by the UE as described in 3GPP Specifications, the proposed mechanism may indicate to UE 310 to perform CIR measurements based on, for example, the CIR parameter indicated by measurement configuration information transmitted from the source cell for determining the best (optimal) target cell for performing a handover of the UE.

In addition, in some implementations, the measurement configuration information may indicate to UE 310 to perform network-configured scaling of CIOs for the target cells (e.g., gNBs 314 and/or 316) based on the CIR measurements when evaluating the entry and/or exit conditions of measurement events that may be based on cell quality measurements. In other words, in addition to considering CIR measurements for performing handover of a UE, CIOs of the cells may be scaled based on CIR measurements of the beams or cells to give priority to cells with radio conditions that may enhance mobility robustness.

At 434, the operations may be same or similar to operations at 334 of FIG. 3. At 436, the operations may be same or similar to operations at 336 of FIG. 3. However, it should be noted that CIOs of cells associated with beams 434 and/or 436 may be scaled based on CIR measurements of corresponding beams/cells to give priority to cells with radio conditions that may enhance mobility robustness (for example, to give priority to cell T2 of FIG. 2 or gNB 314 of FIGS. 3 and 4).

At 440, UE 310 may generate measurement reports similar to the operations at 340 of FIG. 3. In addition, in some implementations, for example, UE 310 may scale (e.g., perform scaling on) cell individual offsets (CIOs), also referred to as CIO values, based at least on CIR measurements when evaluating entry or exit (leaving) conditions of a measurement event based on cell quality measurements. The scaling, for example, may allow for favoring (e.g., biasing) one target cell (e.g., gNB 314) over another target cell (e.g., gNB 316) based on, for example, CIR measurements of the beams from such TRPs/cells.

A cell individual offset (CIO) parameter was introduced in 3GPP Specifications (e.g., TS 38.331 V15.4.0 and TS 36.331 V15.4.0) to provide flexibility in controlling the triggering of a handover with respect to each neighboring cell and in turn improve mobility robustness. For instance, the equations below cover different conditions of a given measurement event when using CIOs:

Entry condition of the measurement event:
$$M_n + CIO > M_s + \text{Off} + \text{Hyst} \quad (1),$$

Leaving condition of the measurement event:
$$M_n + CIO < M_s + \text{Off} - \text{Hyst} \quad (2),$$

where $M_n$ represents measurements of neighboring cells in dBm, $M_s$ represents measurements of serving cell in dBm, CIO represents cell individual offsets in dBm, Off represents Offset for handover, and Hyst represents hysteresis.

In some implementations, for example, source cell gNB 312 may configure UE 310 with different CIO values for different neighbor cells. If the entry condition (e.g., Equation 1) is fulfilled, the UE starts a timer configured with a time-to-trigger (TTT) value. If TTT timer expires, the UE sends a measurement report to the source cell.

In Release 8 of LTE and Release 15 of NR, different CIOs may be configured for different cells. For example, a larger CIO may be assigned to a more robust cell (e.g., gNB 314) and a smaller CIO may be assigned to a less robust cell (e.g., gNB 316). However, this is based on prior knowledge (or information) which is typically not available. However, with Mobility Robustness Optimization (MRO) feature, the network can learn that handovers to the strongest cell (but less robust with correlated beams) may lead to failures caused due to, e.g., blockage, as described above in reference to FIG. 2. In such cases, MRO may decrease (e.g., automatically) the CIO of the less robust neighbor cell(s) and/or increase the CIO of the more robust neighbor cell(s). Since, MRO is a re-active approach that requires collecting data from the network before taking action, it is desirable to have a more pro-active solution. Therefore, the present disclosure proposes a pro-active mechanism that prioritizes cells that offer mobility robustness.

In some implementations, for example, cells with better beams may be prioritized by mapping (or scaling) CIO offsets based on CIR measurements (e.g., cell/TRP rms delay spread). In an example implementation, CIO/rms mapping (e.g., for a macro cell) that may be configured by the network for the UE may be shown as below by equations (3)-(6):

$$CIO = 0 \text{ dB if } 0 \text{ } \mu s < rms < 0.2 * \theta \text{ } \mu s \quad (3),$$

$$CIO = 1 \text{ dB if } 0.2 * \theta \text{ } \mu s < rms < 0.5 * \theta \text{ } \mu s \quad (4),$$

$$CIO = 2 \text{ dB if } 0.5 * \theta \text{ } \mu s < rms < 0.8 * \theta \text{ } \mu s \quad (5),$$

$$CIO = 3 \text{ dB if } 0.8 * \theta \text{ } \mu s < rms \quad (6),$$

where θ may be a cell size scaling factor and rms may be TRP/cell CIR root mean square delay spread.

However, in order to compensate for the dependency of the average CIR rms delay spread on the cell size, cell size scaling factor θ may be introduced in some example implementations as shown below:

TABLE 1

| Cell type | Cell size | Transmit power | θ |
|---|---|---|---|
| Femto cell | 30 m | (10 milliwatts 10 dBm) | ⅛ |
| Pico cell | 100 m | (250 milliwatts 24 dBm) | ¼ |
| Micro cell | 500 m | (2-5 wats 37 dBm) | ½ |
| Macro cell | 2000 m | (200 wats 43 dBm) | 1 |

In some implementations, cell size values different from example values shown above may be used. For example, cell size vales as defined in 3GPP 38.802 may be used.

Therefore, as described above, UE 310 may generated measurement reports with CIO offsets scaled (or mapped) based on CIR measurements such that the source cell selects a target cell which has higher robustness, as described above.

At 442, the UE (e.g., UE 310) may transmit the generated measurement reports to the source cell (e.g., gNB 312).

At 444, the source cell (e.g., gNB 312) may select the target cell for performing a handover of the UE from the source cell to a target cell. In some implementations, for example, gNB 312 may select gNB 314 as the target cell for performing a handover of the UE to gNB 314. In some implementations, for example, gNB 312 may select gNB 314 based on gNB 314 being prioritized due to CIO scaling based on CIR measurements as described above.

At 446, the UE performs a handover to the selected target cell. In some implementations, for example, UE 310 performs handover to gNB 314. Upon successful completion of the handover to gNB 314, gNB 314 becomes the new source cell for UE 310.

Thus, the proposed disclosure, describes a mechanism for identifying and/or selecting a target cell based on CIO scaling using CIR measurements.

In some implementations, for example, the source cell may indicate to UE 310 via the measurement configuration information to include (or report) CIR measurements for a limited (or pre-defined) number of beams (or a sub-set of the beams received by the UE), for example, X number of beams. In such scenarios, for example, UE 310 may include CIR measurements for X (best beams) based on the CIR measurements performed by UE 310. In other words, in some implementations, for example, the source cell may indicate to UE to limit the number of CIR measurements included in the measurement reports generated and/or transmitted by the UE to reduce the size of the measurement reports being transmitted to the source cell. In some implementations, for example, the number of CIR measurements to be reported by the UE may be limited based on comparing the CIR measurements of the received beams to a threshold (e.g., a threshold CIR measurement) and/or other measurements, as configured by the serving cell. In some implementations, for example, the number of CIR measurements to be reported by the UE may be limited based on a combination of a pre-defined number of CIR measurements and a threshold value, as configured by the serving cell.

Figure 5A:
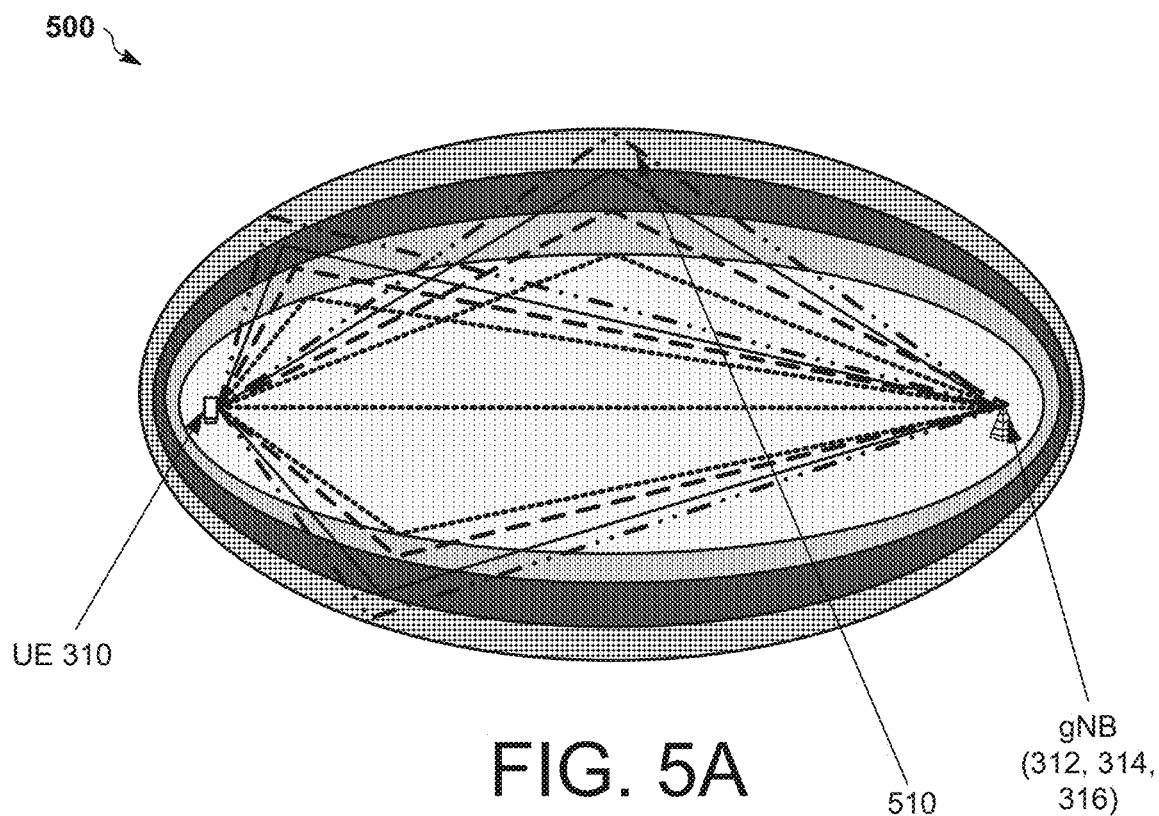
FIGS. 5A and 5B illustrate correlations between CIR delays and angles of arrival, according to at least an example implementation.
Figure 5B:
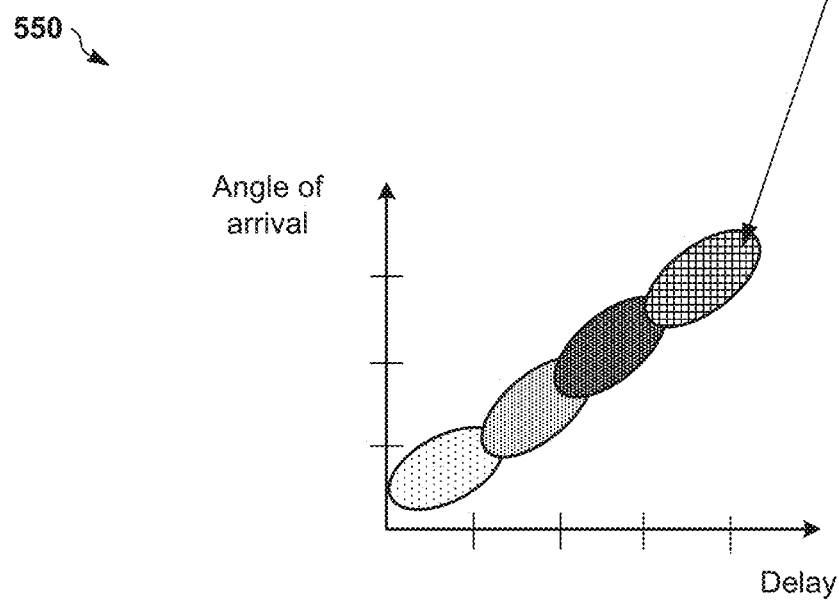

FIGS. 5A and 5B illustrate correlations 500 and 550 between CIR delays and angles of arrival, according to at least an example implementation.

In some implementations, for example, as illustrated in FIG. 5A, beams transmitted from gNBs may take different geometrical trajectories during transmission from the gNBs (e.g., gNBs 312, 314, and/or 316) to a receiver (e.g., UE 310). These trajectories may be typically described as multipath and may be measured using CIR measurements at the receiver. As illustrated in FIG. 5A, the longer the path distance (for instance, including reflections, diffractions, scattering, etc.), the larger the delay of the given path in the CIR, for example, as shown at 510. As each reflection, diffraction, and/or scattering may lead to additional power loss, it may be assumed, statistically, that most delays only have one bounce and therefore a wider angle of arrival. In addition, in some implementations, as there may be strong correlation between delay spread and angular spread at higher frequencies (e.g., 28 GHz mmWave spectrum) in different scenarios (e.g., indoor, outdoor, urban, etc.), it may be concluded (statistically) that rms-delay spread may be a strong indicator of the angular spread of a radio channel between the transmitter and receiver at higher frequencies (e.g., Frequency Range 2 (FR2) in 5G NR), as illustrated in FIG. 5B.

In some implementations, for example, beamforming at gNB and UE may be considered for reliable rms-delay spread. For the beam shapes at gNBs one can consider that the target gNB will use wide beams for the considered UE, thus leading to statistically larger rms-delay spread.

In general, cyclic prefix-orthogonal frequency division multiplexing (CP-OFDM) system receivers are based on pilot-based channel estimation at the physical layer data demodulation. The best performing family of linear channel estimators are based on minimum mean square error (MMSE) and perform near optimum. However, the prerequisite for this type of receivers is the a-priori knowledge of the radio channel multipath delay spread or maximum excess delay to adjust its filter coefficients and the computation of the delay spread can be performed using various known methods. Therefore, it can be assumed that CP-OFDM receiver will compute the RMS delay-spread and this information is available at receiver (UE) side. In addition, other metrics, for example, maximum excess delay of the CIR, full CIR, etc., may also be calculated.

Figure 6A:
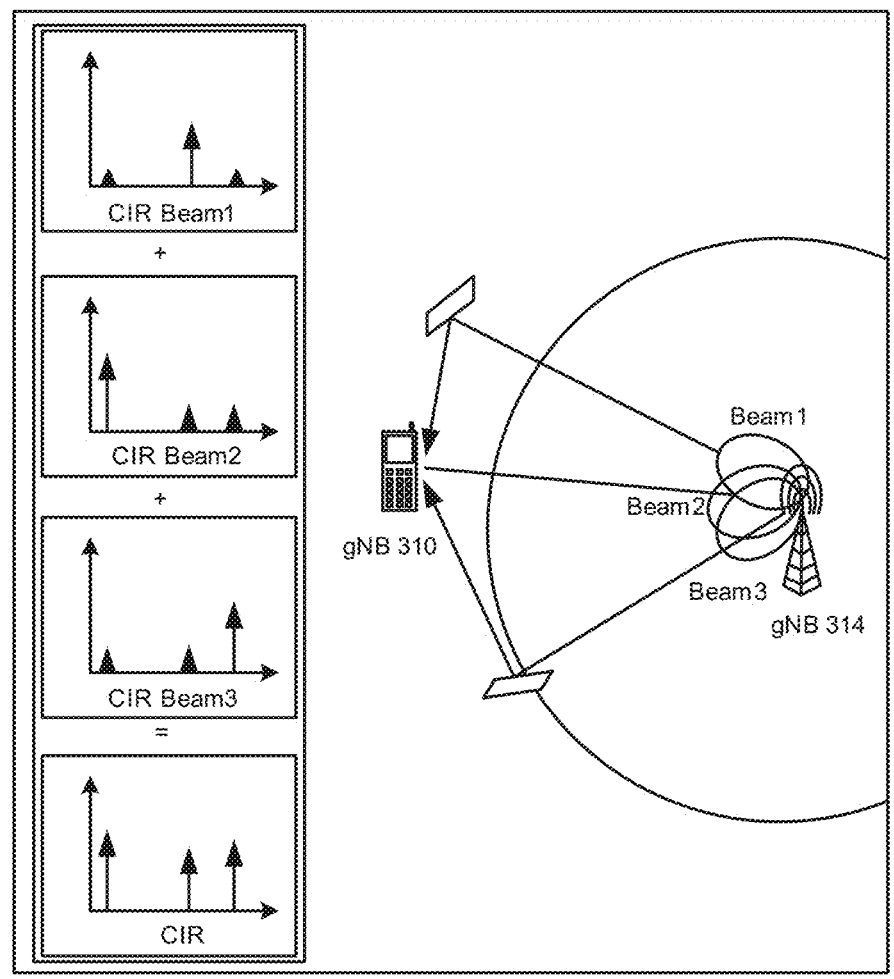
FIG. 6A illustrates a physical example for estimating an average transmission reception point (TRP) channel impulse response (CIR), according to at least one example implementation.
Figure 6B:
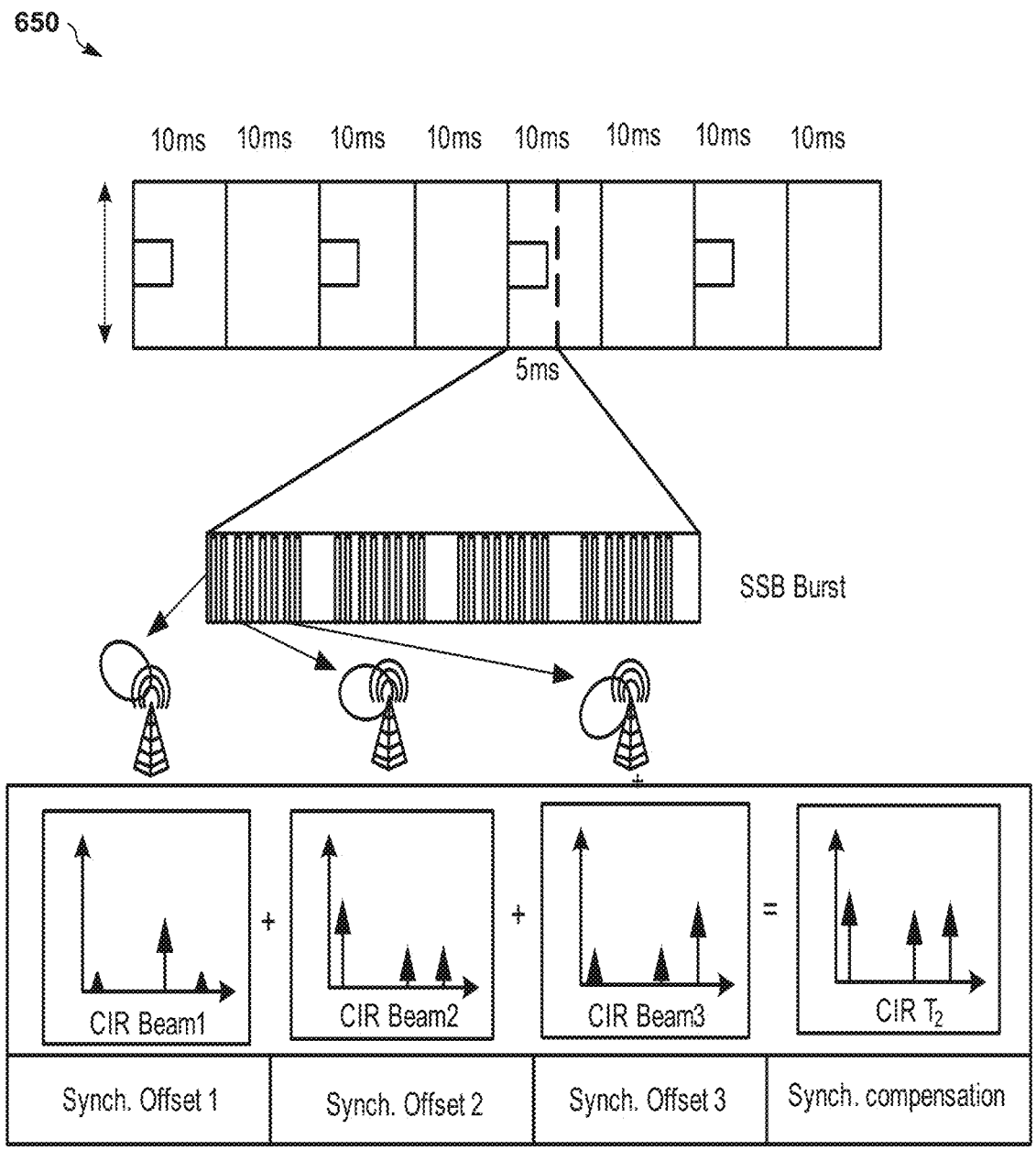
FIG. 6B illustrates an example in time domain for estimating an average transmission reception point (TRP) channel impulse response (CIR), according to at least one example implementation.

FIG. 6A illustrates a physical example 600 for estimating an average transmission reception point (TRP) channel impulse response (CIR), according to at least one example implementation. FIG. 6B illustrates an example in time domain 650 for estimating an average transmission reception point (TRP) channel impulse response (CIR), according to at least one example implementation.

In some implementations, for example, synchronization offset at each CIR estimate should be considered (or kept track of) before performing the total TRP CIR estimate. In some implementations, for example, when UE 310 is in a RRC_CONNECTED state, the UE performs CIR measurements of one or more beams of a cell and the measurements results (e.g., power values) may be averaged to derive the cell quality. In doing so, the UE may be configured to consider a subset of the detected beams.

In an example implementation, it should be noted that filtering may take place at two different levels, for example, 1) at the physical layer to derive beam quality, and 2) at RRC level to derive cell quality from multiple beams. In some implementations, cell quality from beam measurements may be derived in the same way for source and target cells (e.g., serving and non-serving cells).

Figure 7:
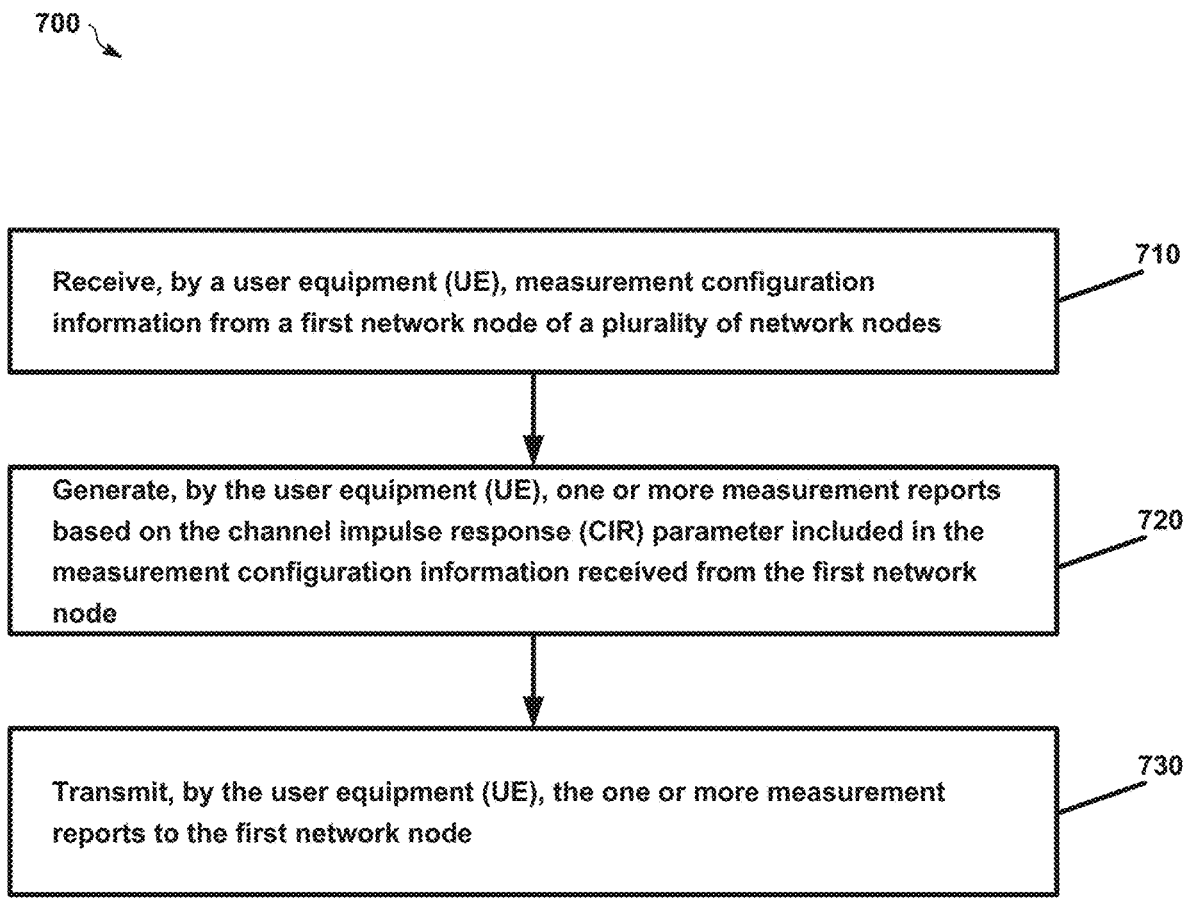
FIG. 7 is a flow chart illustrating transmitting measurement reports which include CIR measurements from a user equipment (UE), according to at least one example implementation.

FIG. 7 is a flow chart 700 illustrating transmitting measurement reports which include CIR measurements from a user equipment (UE), according to at least one example implementation.

At block 710, a UE (e.g., UE 310) may receive measurement configuration information from a first network node (e.g., gNB 312). In some implementations, for example, the first network node (e.g., gNB 312) may include a source cell (or serving cell) of the UE and the UE may receive the measurement configuration information including at least a CIR parameter from the source cell.

At block 720, the UE (e.g., UE 310) may generate one or more measurement reports based on the CIR parameter included in the measurement configuration information received from the first network node (e.g., gNB 312). In some implementations, for example, the measurement reports may include CIR measurements of one or more beams of one or more neighbor cells associated with the first network node (e.g., gNB 312) and/or second network nodes (e.g., gNBs 314, 316, etc.).

At block 730, the UE may transmit the one or more measurement reports to the first network node.

Additional example implementations are described herein.

Example 1. A method of communications, comprising: receiving, by a user equipment (UE), measurement configuration information from a first network node of a plurality of network nodes, the first network node including a serving cell of the user equipment (UE), and the measurement configuration information including at least a channel impulse response (CIR) parameter; generating, by the user equipment (UE), one or more measurement reports based on the channel impulse response (CIR) parameter included in the measurement configuration information received from the first network node, a measurement report of the one or more measurement reports including channel impulse response (CIR) measurements, the channel impulse response (CIR) measurements of one or more beams of one or more neighbor cells associated with the first network node and/or second network nodes of the plurality of network nodes; and transmitting, by the user equipment (UE), the one or more measurement reports to the first network node.

Example 2. The method of Example 1, wherein the channel impulse response (CIR) measurement is based on root mean square (RMS) delay spread of channel impulse response (CIR) of a beam received from a transmission reception point (TRP) of the first network node or a second network node of the second network nodes.

Example 3. The method of any combination of Examples 1-2, wherein the channel impulse response (CIR) measurement is based on an average of channel impulse response (CIR) measurements of a plurality of beams received from transmission reception points (TRP) of the first network node or a second network node of the second network nodes.

Example 4. The method of any combination of Examples 1-3, wherein the channel impulse response (CIR) measurement is a based on a maximum excess delay of a beam received from a transmission reception point (TRP) of the first network node or a second network node of the second network nodes.

Example 5. The method of any combination of Examples 1-4, wherein channel impulse response (CIR) measurement is a channel impulse response (CIR) per beam of the first network node or a second network node of the second network nodes.

Example 6. The method of any combination of Examples 1-5, wherein the measurement report includes channel impulse response (CIR) measurements of a pre-defined number of beams.

Example 7. The method of any combination of Examples 1-6, wherein the measurement report includes the channel impulse response (CIR) measurements for a pre-defined number of beams, the pre-defined number of beams indicated in the measurement configuration information received from the first network node.

Example 8. The method of any combination of Examples 1-7, wherein the user equipment (UE) is in a radio resource control (RRC) CONNECTED mode.

Example 9. The method of any combination of Examples 1-8, further comprising: receiving, by the user equipment (UE), cell individual offset (CIO) values of neighbor cells associated with the first network node and/or second network nodes; scaling, by the user equipment (UE), the cell individual offset (CIO) values of the neighbor cells based at least on corresponding channel impulse response (CIR) measurements when evaluating an entry condition and/or a leaving condition of a measurement event based on cell quality measurements.

Example 10. The method of any combination of Examples 1-9, wherein the cell individual offset (CIO) values are received in the measurement configuration information.

Example 11. The method of any combination of Examples 1-10, wherein the cell individual offset (CIO) values are scaled based at least on a cell sizing factor.

Example 12. An apparatus comprising at least one processor and at least one memory including computer instructions, when executed by the at least one processor, cause the apparatus to perform a method of any of combination of Examples 1-11.

Example 13. An apparatus comprising means for performing a method of any combination of Examples 1-11.

Example 14. A non-transitory computer-readable storage medium having stored thereon computer executable program code which, when executed on a computer system, causes the computer system to perform the steps of any combination of Examples 1-11.

Figure 8:
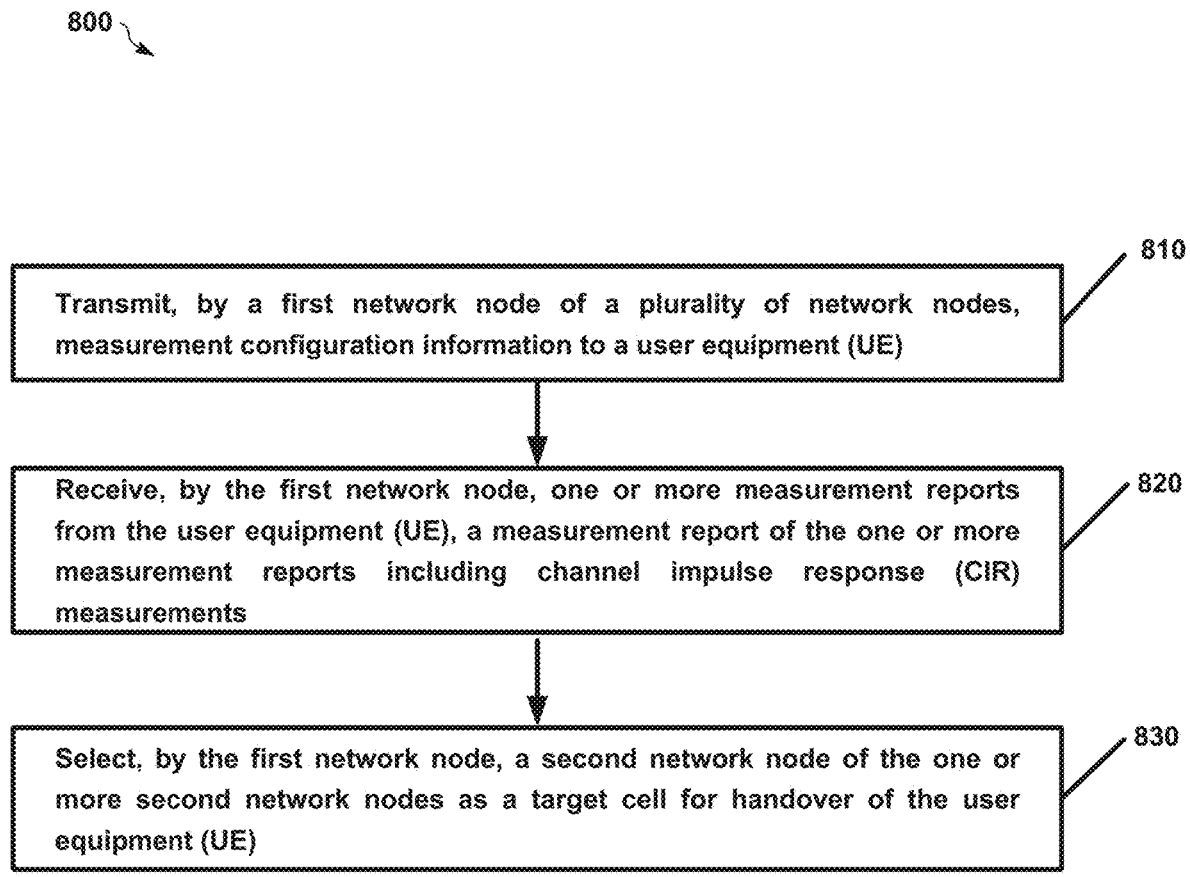
FIG. 8 is a flow chart illustrating selection of a target cell based at least on channel impulse response (CIR) measurements, according to an example implementation.

FIG. 8 is a flow chart 800 illustrating selection of a target cell based at least on channel impulse response (CIR) measurements, according to an example implementation.

At block 810, a first network node (e.g., gNB 312) may transmit measurement configuration information to a UE (e.g., UE 310). In some implementations, for example, the first network node may include a serving cell of the UE and the measurement configuration information may include at least a CIR parameter.

At block 820, the first network node (e.g., gNB 312) may receive one or more measurement reports from the UE (e.g., UE 310). In some implementations, for example, a measurement report may include CIR measurements of one or more beams of one or more neighbor cells associated with the first network node and/or one or more second network nodes (e.g., gNBS 314, 316, etc.).

At block 830, the first network node (e.g., gNB 312) may select a second network node (e.g., gNB 314) as a target cell for handover of the UE. In some implementations, the selection of the target cell may be based at least on the CIR measurements of the target cells (e.g., gNBS 314, 316, etc.) received from the UE.

Additional example implementations are described herein.

Example 15. A method of communications, comprising: transmitting, by a first network node of a plurality of network nodes, measurement configuration information to a user equipment (UE), the first network node including a serving cell of the user equipment (UE), and the measurement configuration information including at least a channel impulse response (CIR) parameter; receiving, by the first network node, one or more measurement reports from the user equipment (UE), a measurement report of the one or more measurement reports including channel impulse response (CIR) measurements, the channel impulse response (CIR) measurements of one or more beams of one or more neighbor cells associated with the first network node and/or one or more second network nodes of the plurality of network nodes; and selecting, by the first network node, a second network node of the one or more second network nodes as a target cell for handover for the user equipment (UE), the one or more target nodes including target cells, and the selecting based at least on the channel impulse response (CIR) measurements received from the user equipment (UE).

Example 16. The method of Example 15, further comprising: determining, by the first network node, cell individual offsets (CIOs) for one or more cells of the first network node and/or the one or more second network nodes based at least on corresponding channel impulse response (CIR) measurements; and transmitting, by the first network node, the cell individual offsets (CIOs) to the user equipment (UE).

Example 17. The method of any combination of Examples 15-16, wherein the channel impulse response (CIR) measurements are scaled based on cell sizes.

Example 18. The method of any combination of Examples 15-17, wherein the measurement reports are generated by the user equipment (UE) based at least on the channel impulse response (CIR) parameter transmitted from the first network node.

Example 19. The method of any combination of Examples 15-18, wherein the measurement reports are generated by the user equipment (UE) based at least on the measurement configuration information transmitted to the user equipment (UE).

Example 20. An apparatus comprising at least one processor and at least one memory including computer instructions, when executed by the at least one processor, cause the apparatus to perform a method of any combination of Examples 15-19.

Example 21. An apparatus comprising means for performing a method of any combination of Examples 15-19.

Example 22. A non-transitory computer-readable storage medium having stored thereon computer executable program code which, when executed on a computer system, causes the computer system to perform the steps of any of combination of claims 15-19.

Figure 9:
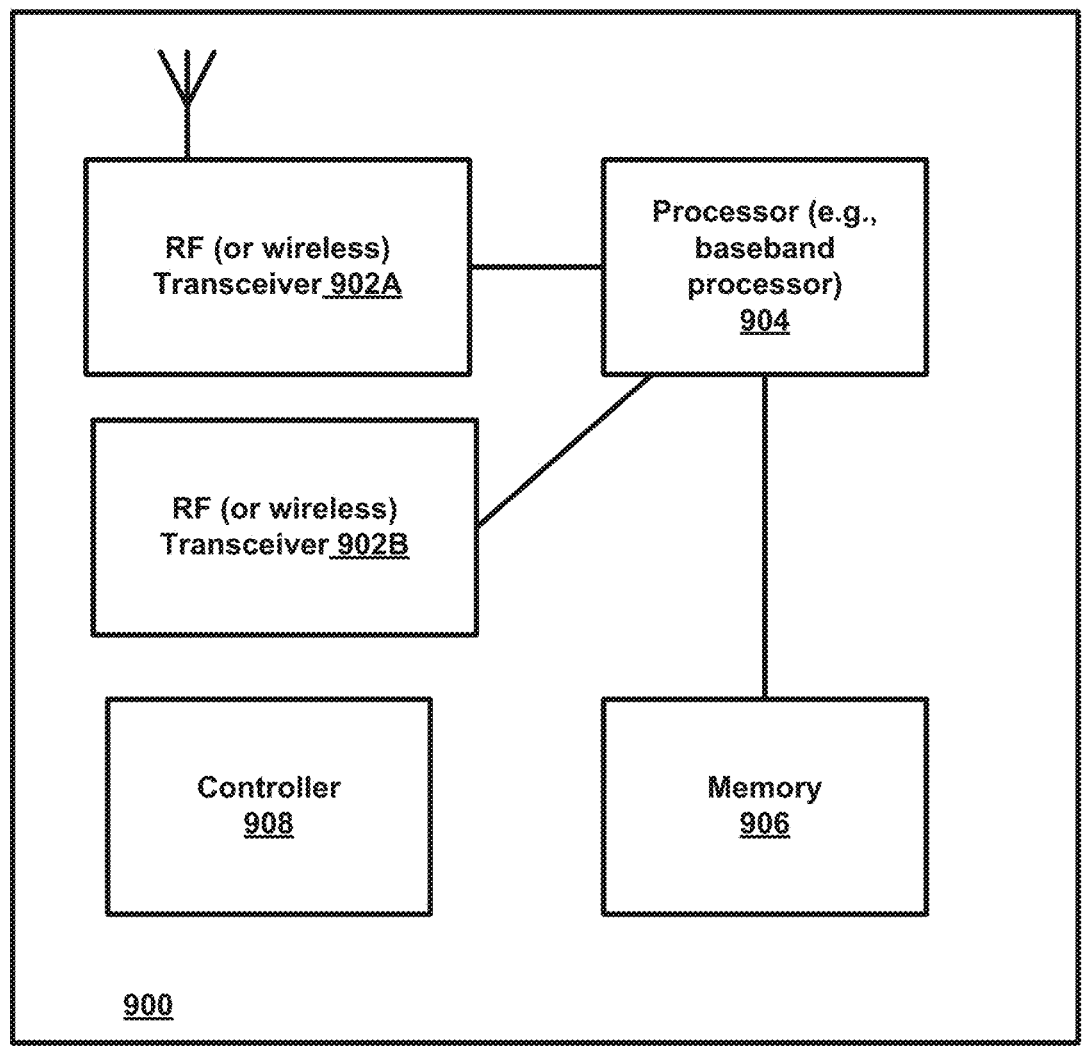
FIG. 9 is a block diagram of a node or wireless station (e.g., base station/access point or mobile station/user device/UE), according to an example implementation.

FIG. 9 is a block diagram 900 of a wireless station (e.g., user equipment (UE)/user device or AP/gNB/MgNB/SgNB) 900 according to an example implementation. The wireless station 900 may include, for example, one or more RF (radio frequency) or wireless transceivers 902A, 902B, where each wireless transceiver includes a transmitter to transmit signals and a receiver to receive signals. The wireless station also includes a processor or control unit/entity (controller) 904/908 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software. Moreover, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method, comprising:
   receiving, by a user equipment, measurement configuration information from a first network node of a plurality of network nodes, the first network node including a serving cell of the user equipment, and the measurement configuration information including at least a channel impulse response parameter;
   generating, by the user equipment, one or more measurement reports based on the channel impulse response parameter included in the measurement configuration information received from the first network node, a measurement report of the one or more measurement reports including channel impulse response measurements, the channel impulse response measurements of one or more beams of one or more neighbor cells associated with the first network node and/or second network nodes of the plurality of network nodes;
   transmitting, by the user equipment, the one or more measurement reports to the first network node;
   receiving, by the user equipment, cell individual offset values of neighbor cells associated with the first network node and/or second network nodes; and
   scaling, by the user equipment, the cell individual offset values of the neighbor cells based at least on corresponding channel impulse response measurements when evaluating an entry condition and/or a leaving condition of a measurement event based on cell quality measurements.

2. The method of claim 1, wherein the channel impulse response measurement is based on at least one of:
   root mean square delay spread of channel impulse response of a beam received from a transmission reception point of the first network node or a second network node of the second network nodes;
   an average of channel impulse response measurements of a plurality of beams received from transmission reception points of the first network node or a second network node of the second network nodes; or
   a maximum excess delay of a beam received from a transmission reception point of the first network node or a second network node of the second network nodes.

3. The method of claim 1, wherein channel impulse response measurement is a channel impulse response per beam of the first network node or a second network node of the second network nodes.

4. The method of claim 1, wherein the measurement report includes the channel impulse response measurements for a pre-defined number of beams, the pre-defined number of beams indicated in the measurement configuration information received from the first network node.

5. The method of claim 1, wherein the cell individual offset values are received in the measurement configuration information, and wherein the cell individual offset values are scaled based at least on a cell sizing factor.

6. An apparatus, comprising:
at least one processor and at least one memory including computer instructions, when executed by the at least one processor, cause the apparatus at least to:
receive measurement configuration information from a first network node of a plurality of network nodes, the first network node including a serving cell of the apparatus, and the measurement configuration information including at least a channel impulse response parameter;
generate one or more measurement reports based on the channel impulse response parameter included in the measurement configuration information received from the first network node, a measurement report of the one or more measurement reports including channel impulse response measurements, the channel impulse response measurements of one or more beams of one or more neighbor cells associated with the first network node and/or second network nodes of the plurality of network nodes;
transmit the one or more measurement reports to the first network node;
receive cell individual offset values of neighbor cells associated with the first network node and/or second network nodes; and
scale the cell individual offset values of the neighbor cells based at least on corresponding channel impulse response measurements when evaluating an entry condition and/or a leaving condition of a measurement event based on cell quality measurements.

7. The apparatus of claim 6, wherein the channel impulse response measurement is based on at least one of:
root mean square delay spread of channel impulse response of a beam received from a transmission reception point of the first network node or a second network node of the second network nodes;
an average of channel impulse response measurements of a plurality of beams received from transmission reception points of the first network node or a second network node of the second network nodes; or
a maximum excess delay of a beam received from a transmission reception point of the first network node or a second network node of the second network nodes.

8. The apparatus of claim 6, wherein channel impulse response measurement is a channel impulse response per beam of the first network node or a second network node of the second network nodes.

9. The apparatus of claim 6, wherein the measurement report includes the channel impulse response measurements for a pre-defined number of beams, the pre-defined number of beams indicated in the measurement configuration information received from the first network node.

10. The apparatus of claim 6, wherein the apparatus is in a radio resource control mode.

11. The apparatus of claim 6, wherein the cell individual offset values are received in the measurement configuration information.

12. The apparatus of claim 6, wherein the cell individual offset values are scaled based at least on a cell sizing factor.

13. The apparatus of claim 6, wherein the measurement report of the one or more measurement reports is used for preparation for handover of the user equipment from the apparatus to a target network node selected among the one or more second network nodes.

14. An apparatus, comprising:
at least one processor and at least one memory including computer instructions, when executed by the at least one processor, cause the apparatus at least to:
transmit, by a first network node of a plurality of network nodes, measurement configuration information to a user equipment, the first network node including a serving cell of the user equipment, and the measurement configuration information including at least a channel impulse response parameter;
receive, by the first network node, one or more measurement reports from the user equipment, a measurement report of the one or more measurement reports including channel impulse response measurements, the channel impulse response measurements of one or more beams of one or more neighbor cells associated with the first network node and/or one or more second network nodes of the plurality of network nodes;
determine, by the first network node, cell individual offsets for one or more cells of the first network node and/or the one or more second network nodes based at least on corresponding channel impulse response measurements; and
transmit, by the first network node, the cell individual offsets to the user equipment.

15. The apparatus of claim 14, wherein the channel impulse response measurements are scaled based on cell sizes.

16. The apparatus of claim 14, wherein the measurement reports are generated by the user equipment based at least on one of:
the channel impulse response parameter transmitted from the first network node, or
the measurement configuration information transmitted to the user equipment.

17. The apparatus of claim 14, wherein the measurement report of the one or more measurement reports is used for preparation for handover of the user equipment from the apparatus to a target network node selected among the one or more second network nodes.

* * * * *